(12) United States Patent
Fermelis et al.

(10) Patent No.: US 12,444,927 B2
(45) Date of Patent: Oct. 14, 2025

(54) DISTRIBUTION AND SIGNALING UNIT WITH OVER VOLTAGE PROTECTION FOR FIBER OPTIC AND POWER CABLES

(71) Applicant: RAYCAP IP ASSETS LTD, Nicosia (CY)

(72) Inventors: Elias Fermelis, Koropi (GR); Shawn A. Warner, Rathdrum, ID (US); Kostas Bakatsias, Gerakas (GR); Charis Coletti, Nea Erythrea (GR)

(73) Assignee: RAYCAP IP ASSETS LTD, Nicosia (CY)

( * ) Notice: Subject to any disclaimer, the term of this patent is extended or adjusted under 35 U.S.C. 154(b) by 245 days.

(21) Appl. No.: 18/295,778

(22) Filed: Apr. 4, 2023

(65) Prior Publication Data
US 2024/0339828 A1    Oct. 10, 2024

(51) Int. Cl.
*H02H 7/22*    (2006.01)
*G02B 6/44*    (2006.01)

(52) U.S. Cl.
CPC ............. *H02H 7/22* (2013.01); *G02B 6/4441* (2013.01)

(58) Field of Classification Search
CPC .. G02B 6/4441; G02B 6/4448; G02B 6/4472; H02H 7/22
USPC .......................................................... 361/62
See application file for complete search history.

(56) References Cited

U.S. PATENT DOCUMENTS

| | | |
|---|---|---|
| 10,181,717 B2 | 1/2019 | Miller |
| 10,971,928 B2 | 4/2021 | Warner |
| 2015/0155706 A1* | 6/2015 | Miller ...................... H01T 4/06 361/118 |
| 2017/0141563 A1 | 5/2017 | Islam et al. |
| 2018/0115120 A1 | 4/2018 | Islam |
| 2020/0076187 A1* | 3/2020 | Warner .................... H01Q 1/50 |
| 2021/0091481 A1* | 3/2021 | Fermelis ............ G02B 6/44265 |
| 2021/0191481 A1 | 6/2021 | Deng |

FOREIGN PATENT DOCUMENTS

EP    3798706 A1    3/2021

* cited by examiner

*Primary Examiner* — Kevin J Comber
(74) *Attorney, Agent, or Firm* — Schwabe Williamson & Wyatt

(57) ABSTRACT

A distribution and signaling unit comprises an enclosure having walls forming an interior and an exterior receives a trunk cable entering an interior portion of the enclosure. Hybrid adaptors are arranged in an array in the interior and extend through one or more of the walls of the enclosure. A plurality of printed circuit board assemblies (PCBAs) are mounted in the enclosure. A plurality of over voltage protection (OVP) modules are each mounted adjacent to the hybrid adaptors. A PCBA module is in the enclosure and transmits alarm signals or transmit voltage values measured from the power cables to a remote location.

21 Claims, 15 Drawing Sheets

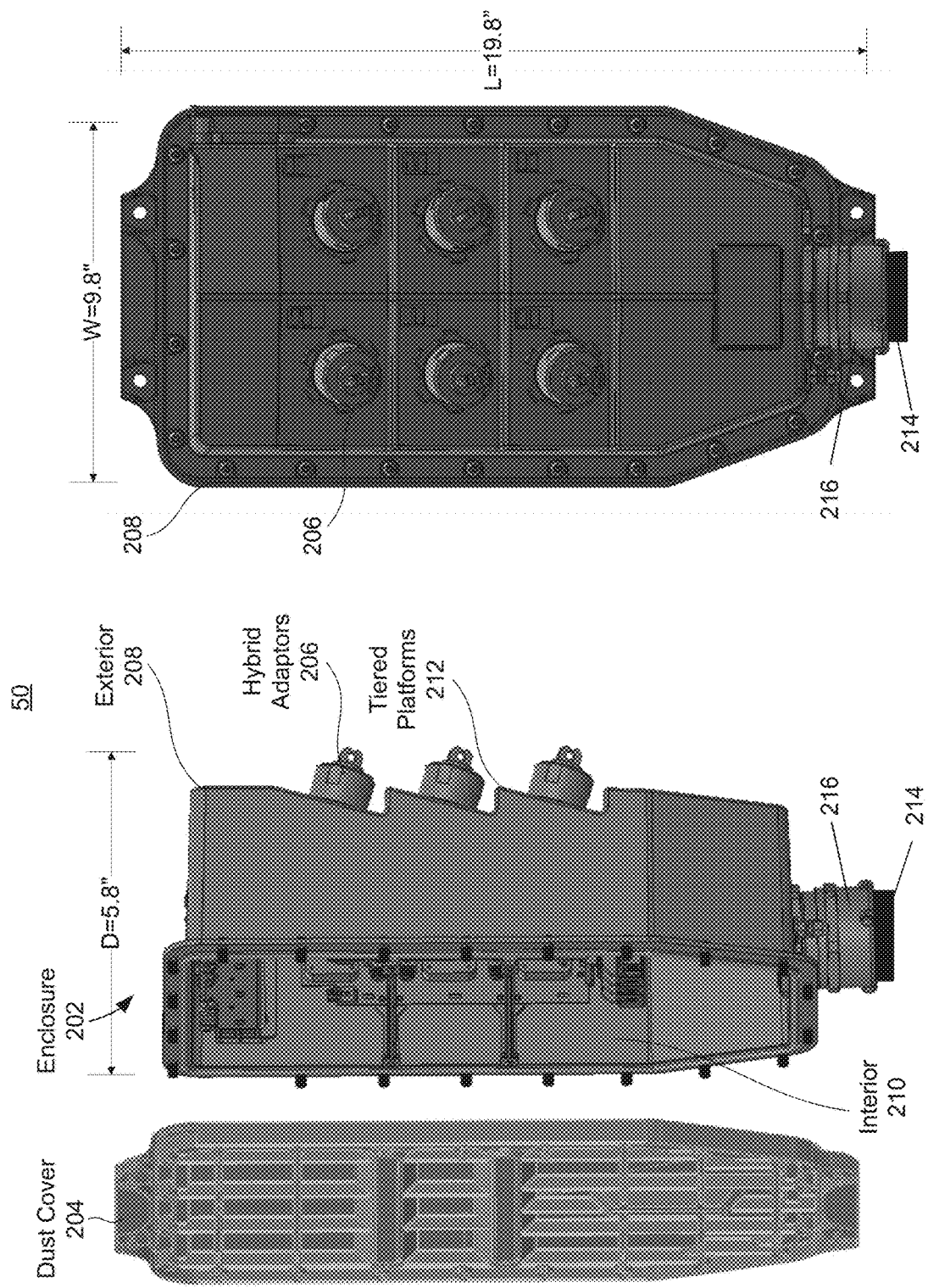

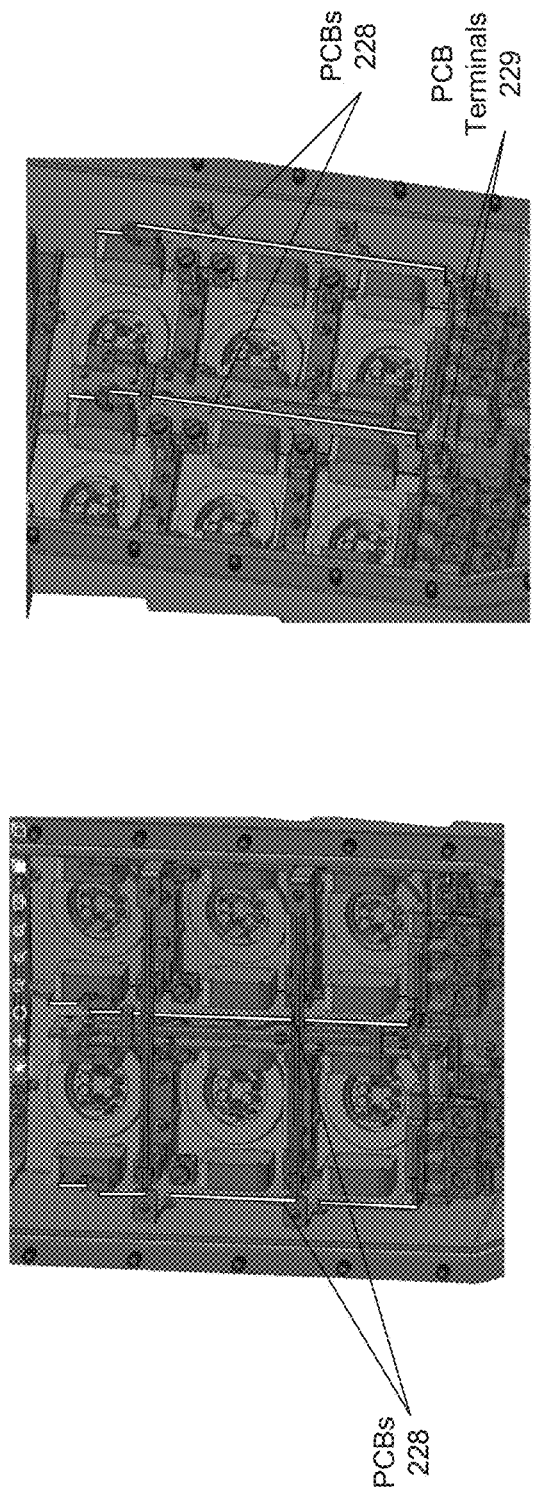
FIG. 2D
FIG. 2E
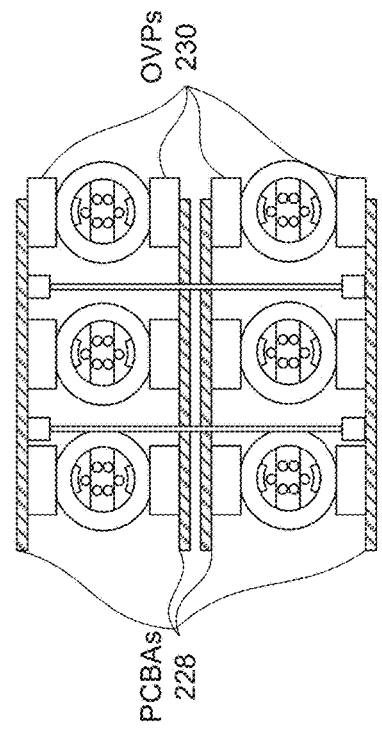
FIG. 2F

Ground
Bus Bars
250

DISTRIBUTION AND SIGNALING UNIT WITH OVER VOLTAGE PROTECTION FOR FIBER OPTIC AND POWER CABLES

BACKGROUND

Cellular tower sites are increasingly distributed around the world to provide mobile communications for a variety of devices. Such sites typically include a radio unit connected to an antenna using radio frequency (RF) cabling, where the radio unit is supplied power by an input power cable (e.g., at −48 volts DC) and a return cable back to a power supply located in a shelter. Additionally, data is communicated between one or more base station units (also located in the shelter) and the radio unit over fiber optic cabling.

The cellular site also performs various processing to, for example, determine the appropriate frequency band for a transmission, amplify a signal, transmit and receive signals, etc. In older networks, this type of processing was typically done at the base inside the shelter. However, latest generation wireless communications systems, referred to as distributed antenna systems (DAS), distributed DC radio systems, remote radio heads (RRH), 4G and long term evolution (LTE) cellular communication systems, commonly locate the radios next to the antennas on the tower outside of the communications shelter. At least some such processing (e.g., analog/digital conversion) has been moved from the base station unit in the shelter to a processing unit located near the top of the cellular tower. This prevents the loss of a considerable amount of energy via the radio frequency (RF) cable connection between the base station unit and the antenna(s) at the top of the tower.

However, while performing processing at the top of the tower near the antenna helps to minimize energy loss, additional power and fiber optic cabling is required to supply power and data from the shelter to the unit on the tower. Conventional processing units are thus susceptible to damage and disruption from overvoltage and surge current when a lightning strike hits the tower (or nearby). Additionally, towers may host a number of different radio/antenna combinations, thus providing an issue for routing multiple DC link cables to fit the radios, and protecting the connections from overvoltage.

In some cases, hybrid cables are used in cellular sites to combine both fiber and power conductors. Inside such hybrid cables, there are copper wires that feed several radios with power, along with fiber optic cabling to provide a data connection to the radios. Typically, the hybrid cable is terminated in an enclosure and individual surge protectors are provided for each of the DC circuits that feed the radio. The fibers from the fiber optic cabling are terminated inside the enclosure and fiber jumpers are used to connect them to the radios. Likewise, power jumpers are used to connect the power wiring to each radio to the enclosure.

One significant issue arising in conventional cellular sites is that the space available for the fiber optic breakout assembly (and other components) is extremely limited on the cellular tower, and this space is often costly for cellular operators to rent from owners of the tower.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIGS. 2A, 2B and 2C are diagrams illustrating side, back and front views, respectively, of a distribution and signaling unit in accordance with the disclosed embodiments.

FIGS. 2D and 2E are diagrams illustrating angled views of printed circuit board assemblies in the enclosure.

FIG. 2F is a diagram illustrating a front view of the enclosure in another embodiment.

DETAILED DESCRIPTION

Figure 1:
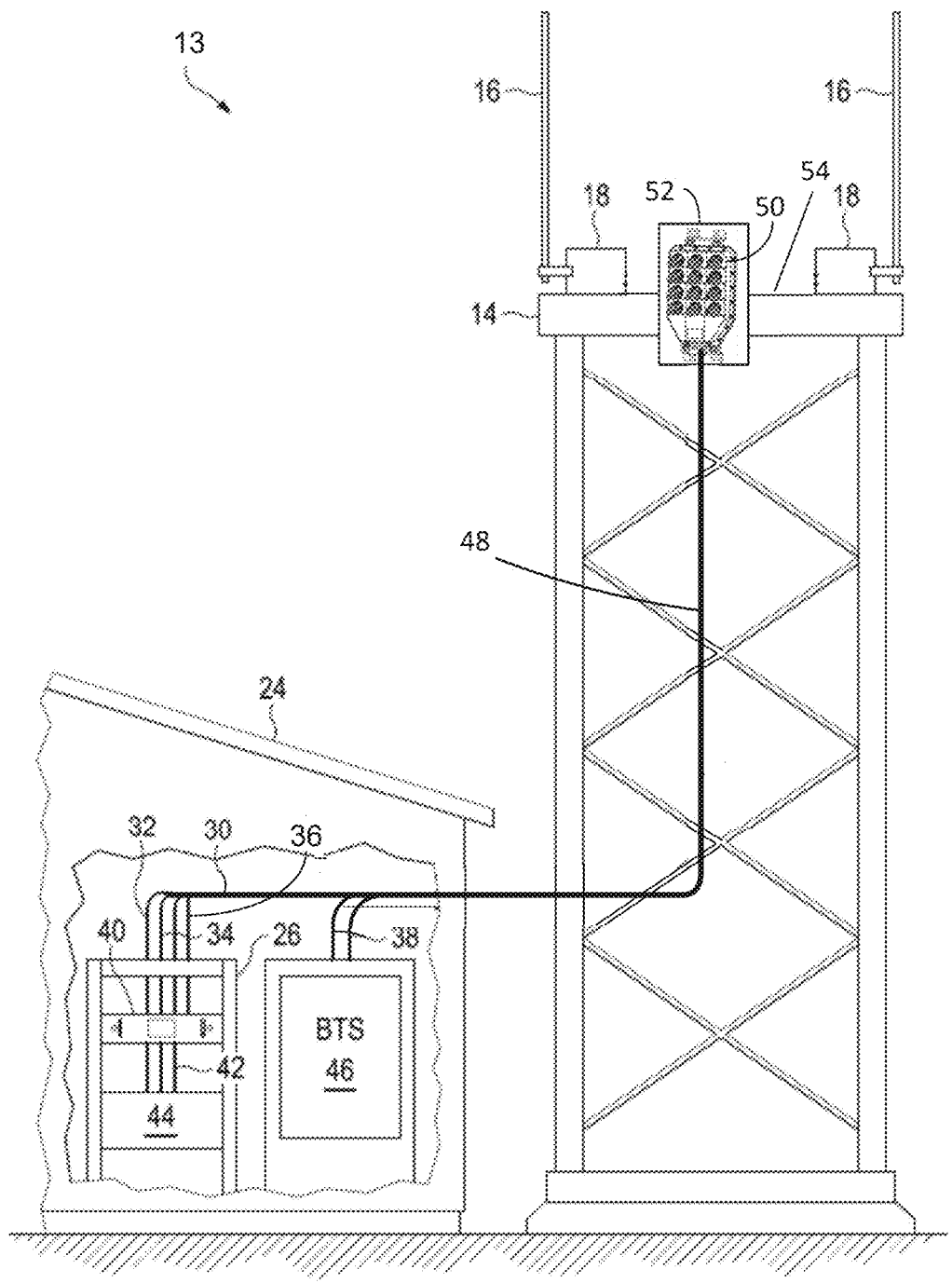
FIG. 1 is a diagram illustrating an example of a power and communication system in accordance with various embodiments of the disclosure.

The disclosed embodiments relate to methods and systems for a distribution and signaling unit for fiber optic and power cables. The following description is presented to enable one of ordinary skill in the art to make and use the invention and is provided in the context of a patent application and its requirements. Various modifications to the exemplary embodiments and the generic principles and features described herein will be readily apparent. The disclosed embodiments are mainly described in terms of particular methods and systems provided in particular implementations. However, the methods and systems will operate effectively in other implementations. Phrases such as "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The disclosed embodiments will also be described in the context of particular methods having certain steps. However, the method and system operate effectively for other methods having different and/or additional steps and steps in different orders that are not inconsistent with the exemplary embodiments. Thus, the disclosed embodiments are not intended to be limited to the embodiments shown, but is to be accorded the widest scope consistent with the principles and features described herein.

The disclosed embodiments relate to a distribution and signaling (pendant) unit for fiber optic and power cables, which is installed at the top of cellular site towers to feed cellular radios. Embodiments of the present disclosure address the space issue of conventional cellular sites by providing a distribution and signaling unit that can distribute both power and data connections from a power and fiber cables (or from a hybrid cable containing both power and fiber) within a compact enclosure that helps reduce the overall footprint of the pendant unit mounted on a cellular tower. The distribution and signaling unit or device comprises an enclosure having walls forming an interior and an exterior and is installed on a trunk cable that feeds tower equipment, preferably at the factory of a trunk cable manufacturer, simplifying installation. Hybrid adaptors are arranged in an array in the interior and extend through one or more of the walls of the enclosure. A plurality of printed circuit board assemblies (PCBAs) are mounted in the enclosure. In one embodiment, pairs of the PCBAs may be located in proximity to respective ones of the hybrid adaptors. The hybrid adaptors are further connected externally from the enclosure to cellular radios or remote radio heads (RRHs) on a tower. A plurality of over voltage protection (OVP) modules are mounted in the enclosure. In one embodiment the OVP modules are each mounted directly on one of the plurality of the PCBAs adjacent to the hybrid adaptors. A PCBA module is in a chamber in the enclosure and is coupled to the PCBAs to transmit alarm signals or to transmit voltage values measured from the power cables to a remote location. In one embodiment, the PCBA module is slideably removable in and out of the chamber. All of these features are integrated within the distribution and signaling unit that is approximately 55%-65% smaller in form factor that conventional distribution units.

FIG. 1 illustrates one example of a power and communication system 13 that provides suppression for a distributed wireless communication station. A building 24 contains computing equipment for a base transceiver station (BTS) 46, which may also be referred to herein as a "baseband unit." The BTS 46 is connected through fiber optic cables 38 to different radios 18 (also referred to herein as remote radio units 18 "RRUs") located on the top of a tower 14. A direct current (DC) power system 44 is connected through DC power cables 30 to the different radios 18 on tower 14. The power system 44 may also be referred to herein as a "power supply unit." In one example, DC power cables 30 include sets of −48 DC volt power cables 32, return power cables 34, and associated ground cables. In one example, power cables 30 and fiber optic cables 38 are run through a same hybrid trunk cable 48 that is routed out of building 24 and up tower 14 to a distribution and signaling unit 50 of the disclosed embodiments.

A distribution and signaling unit 50 (also referred to as a pendant) is attached to a support 52 on top of tower 14 and is connected to the remote ends of power cables 30 and fiber optic cables 38 proximate to radios 18 (or remote radio heads (RRHs)) and antennas 16. Radios 18 may be connected to their respective antennas 16 via short RF cables. According to the disclosed embodiments, the distribution and signaling unit 50 is used to contain suppression devices and to act as a junction box for fiber optic cable jumpers that are distributed out to radios 18. In another configuration, distribution and signaling unit 50 may be connected to the individual DC power cables 30 and located next to the associated radios 18 on the roof of the building. Individual distribution and signaling unit units 50 can be connected to individual DC power cables 30 close to different radios 18 on the roof of the building.

A base suppression unit 40 may be located inside of building 24 and connected to the local ends of power cables 30 relatively close to DC power plant 44 and BTS 46. In one embodiment, base suppression unit 40 is located in a rack 26 that also contains DC power plant 44. In another example, base suppression unit 40 is located in another rack or some other location next to power plant 44. Examples of base suppression units are described in U.S. Pat. No. 10,181,717 which is incorporated by reference in its entirety.

A monitor cable 36 may connect monitor circuitry in distribution and signaling unit 50 with monitoring circuitry in base suppression unit 40 so that the base suppression unit 40 can receive different alarm and voltage conditions from the distribution and signaling unit 50. For example, the distribution and signaling unit 50 may signal the base suppression unit 40 of a detected failure of a suppression device within distribution and signaling unit 50, detected intrusion into distribution and signaling unit 50, detected water infiltration within remote suppression unit, and/or detected voltage levels within distribution and signaling unit 50. In addition, the monitor circuitry within the distribution and signaling unit 50 may transmit alarms to the base suppression unit 40 when such failures are detected.

The distribution and signaling unit may also be referred to as a hybrid distribution unit, a hybrid fiber to the antenna (FTTA) or a power to the antenna (PTTA) distribution unit. As illustrated in FIG. 1, the distribution and signaling unit 50 may be installed on a mobile communications tower or mast (such as tower 14) to provide for the connection and distribution of the hybrid trunk cable 48 to jumpers 54 coupled to the remote radio units 18. As described in more detail, below, the distribution and signaling unit 50 also provides integrated over voltage protection (OVP) modules to help protect the remote radio units 18.

Among other things, distribution and signaling unit 50 of the present disclosure simplifies deployment and accelerates installation as it can be provided pre-terminated (e.g., no cable connections required in the field). In addition, the distribution and signaling unit 50 provides higher installation capacity compared to conventional distribution units by supporting a high number of RRUs.

Figure 2C:
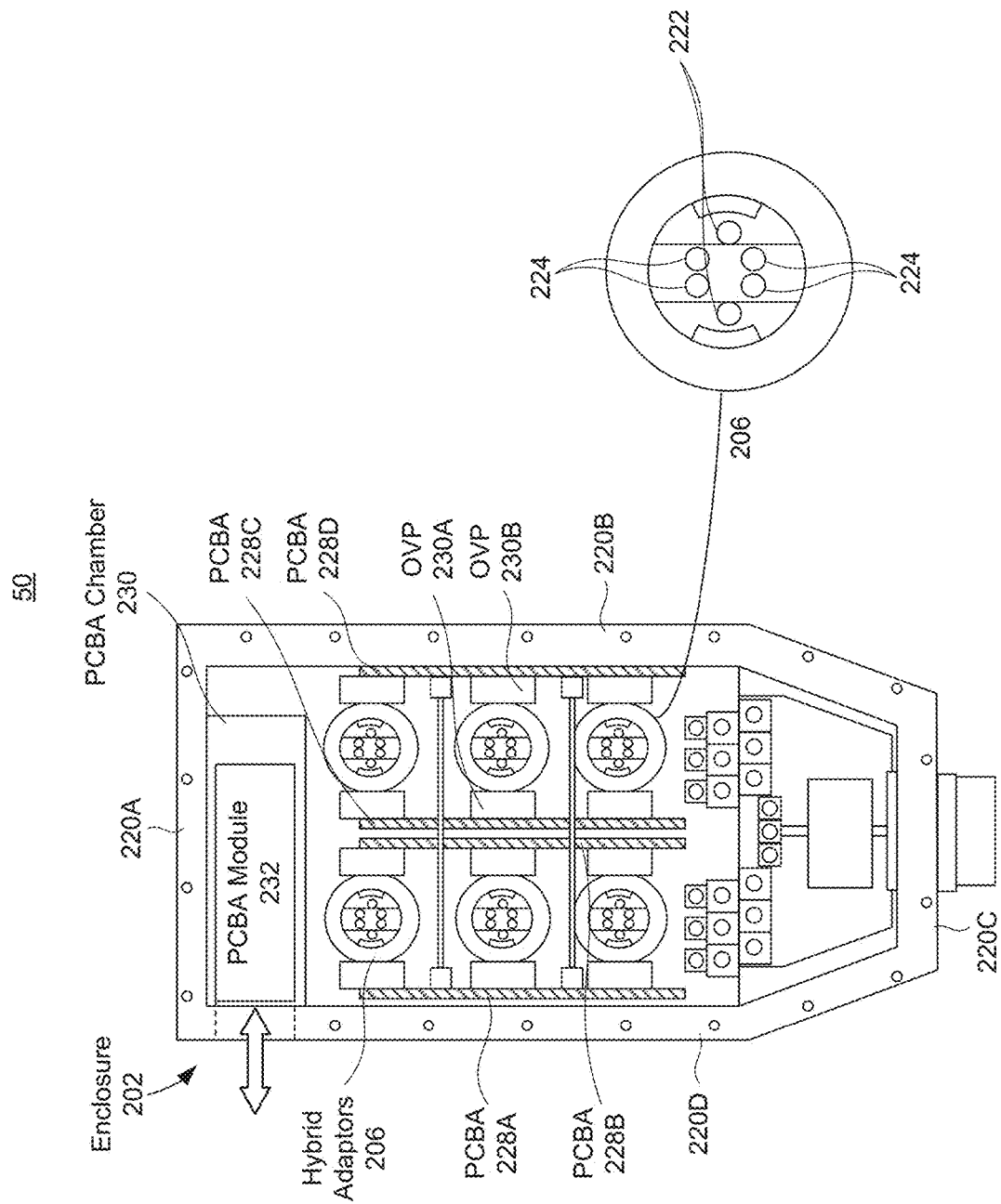

FIGS. 2A, 2B and 2C illustrate side, back and front views, respectively, of a distribution and signaling unit 50 in accordance with the disclosed embodiments. The distribution and signaling unit 50 comprises an enclosure 202 having a removable dust cover 204 on one side and hybrid adaptors 206 extending out an exterior portion 208 on an opposite or back side. Removal of the dust cover 204 reveals an interior portion 210 of the enclosure 202, as shown in the FIG. 2A side view showing a partial cross section. In this example, dust cover 204 may be coupled (e.g., using screws or nuts and bolts) around a perimeter of exterior portion 208 to enclose and protect the interior portion 210 of the enclosure 202. The dust cover 204 may also include (or be coupled to) support brackets (not shown) that allows the distribution and signaling unit 50 to be mounted on the tower 14.

As shown in FIGS. 2A and 2B, the hybrid adaptors 206 may be arranged in rows and columns and the exterior portion 208 includes a plurality of tiered angled platforms 212, with each platform configured to retain a row of the hybrid adaptors 206. In this example, three angled platforms 212 are shown, each with two hybrid adaptors 206 per tiered angled platform to 12, but alternative embodiments may include more or fewer platforms, and more or fewer hybrid adaptors 206 per platform. In this example, the plurality of tiered angled platforms 212 face diagonally downward to protect the hybrid adaptors 206 from weather and to assists an installer (usually standing below the distribution and signaling unit 50 on a ladder or other support) to connect or disconnect cabling to the hybrid adaptors 206.

The distribution and signaling unit is configured to connect to ends of one or more trunk cables 214. The trunk cable may comprise a hybrid cable that includes: i) one or more sets of power cables, ii) one or more fiber optic cables, and iii) one or more signaling cables. A cable entry and clamping mechanism 216 is disposed at the bottom of the enclosure 202 and is configured to receive the trunk cable(s) 214. In alternative embodiments, the cable entry and clamping mechanism 216 may be configured to receive separate power and data cables, such as a first trunk cable that includes one or more sets of power cables and a second trunk cable that includes one or more fiber optic cables. In one embodiment, no sealant is required inside the cable entry and clamping mechanism 216. The cable entry and clamping mechanism 216 may allow for both factory installation and field installation of the trunk cable(s) to distribution and signaling unit 50. For example, in some cases the distribution and signaling unit 50 may be pre-wired and terminated during factory assembly such that an installer is not required to make any cable connections in the field.

FIG. 2C illustrates an example of the interior portion of distribution and signaling unit 50. This view shows that the enclosure 202 includes walls 220A, 220B, 220C and 220D (collectively referred to as walls 220) that form the interior portion 210 and the exterior portion 208. In addition, as shown in FIG. 2C, the enclosure may be tapered at the bottom such that the width of the bottom of the enclosure is narrower than the overall width of the enclosure. This helps to conserve space while still providing an efficient and effective routing of the cabling that can easily be accessed by installers or maintenance personnel.

According to disclosed embodiments, the hybrid adaptors 206 are arranged in an array of rows and columns. The hybrid adaptors 206 extend through one or more of the walls 220 of the enclosure, such as a rear or back wall. Additionally or alternatively, the hybrid adaptors 206 may extend through the sides walls 220B and 220D. Each of the hybrid adaptors 206 further include a power terminals and a fiber terminal in an interior of the enclosure. For example, in FIG. 2C, each hybrid adaptor 206 may include a pair of power terminals 222, corresponding to an input power terminal and return power terminal. The hybrid adaptor 206 further includes fiber optic terminals 224. There are two pairs of fiber optic terminals 224 in this example, one pair for a top set of connectors and one for the pair for a bottom set of connectors.

FIG. 2C illustrates the interior portion of the enclosure in which a plurality of printed circuit board assemblies (PCBAs) 228A-228D (collectively referred to as PCBAs 228) are mounted in the enclosure 202. FIGS. 2D and 2E are diagrams showing an angled view of the PCBAs 228 in the enclosure 202.

According to one aspect of the disclosed embodiments, pairs of the PCBAs, such as PCBA 228A and PCBA 228B, are located in proximity to the hybrid adaptors 206. In one embodiment, a pair of PCBAs 228 is mounted in the enclosure 202 in proximity to each column of hybrid adaptors 206 in the array. In this example, two pairs of PCBAs 228 are shown, for a total of four PCBAs 228. The first pair may comprises comprise PCBA 228A located adjacent to a first side of the first column of hybrid adaptors 206, and a PCBA 228B located adjacent to a second side of the first column of hybrid adaptors 206. The second pair comprises PCBA 228C located adjacent to a first side of the second column of hybrid adaptors 206, and PCBA 228D located adjacent to a second side of the second column of hybrid adaptors 206.

FIG. 2E further shows that one end of the PCBAs 228 include PCB terminals 229. One of the PCBAs 228 in the pair of PCBAs 228 is connected to −48V terminal 242 (FIG. 4A) and other PCBA in the pair is connected to the RTN terminal 244 (FIG. 4A) in the enclosure 202. In one embodiment, each pair of the PCBAs 228 is mounted perpendicular to the wall, as shown in FIGS. 2D and 2E. In an alternative embodiment, each pair of the PCBAs 228 may be mounted parallel (flat) to the rear wall. However, mounting the PCBAs 228 parallel to the rear wall would likely require a larger sized enclosure.

Additionally or alternatively, the PCBAs 228 may be mounted in the enclosure in proximity to each row of the hybrid adaptors 206, instead of each column of hybrid adaptors 206, as shown in FIG. 2F.

In one embodiment, the PCBAs 228A-228D extend a length of the columns (or rows) of the hybrid adaptors 206. However, in another embodiment, there could be separate smaller pairs of PCBAs 228 for each hybrid adaptor 206 in each column or row. Each pair of the PCBAs 228 is mounted to one of the walls in the interior portion 210 of the enclosure. In one embodiment, each of the PCBAs 228 may be mounted to a rear wall of the enclosure. In another embodiment, PCBAs 228A and 228D located along sides of the enclosure 202 may be mounted to the side walls 220D and 220B. PCBAs 228B and 228C located in the middle of the enclosure may be mounted to the rear wall.

Figure 3A:
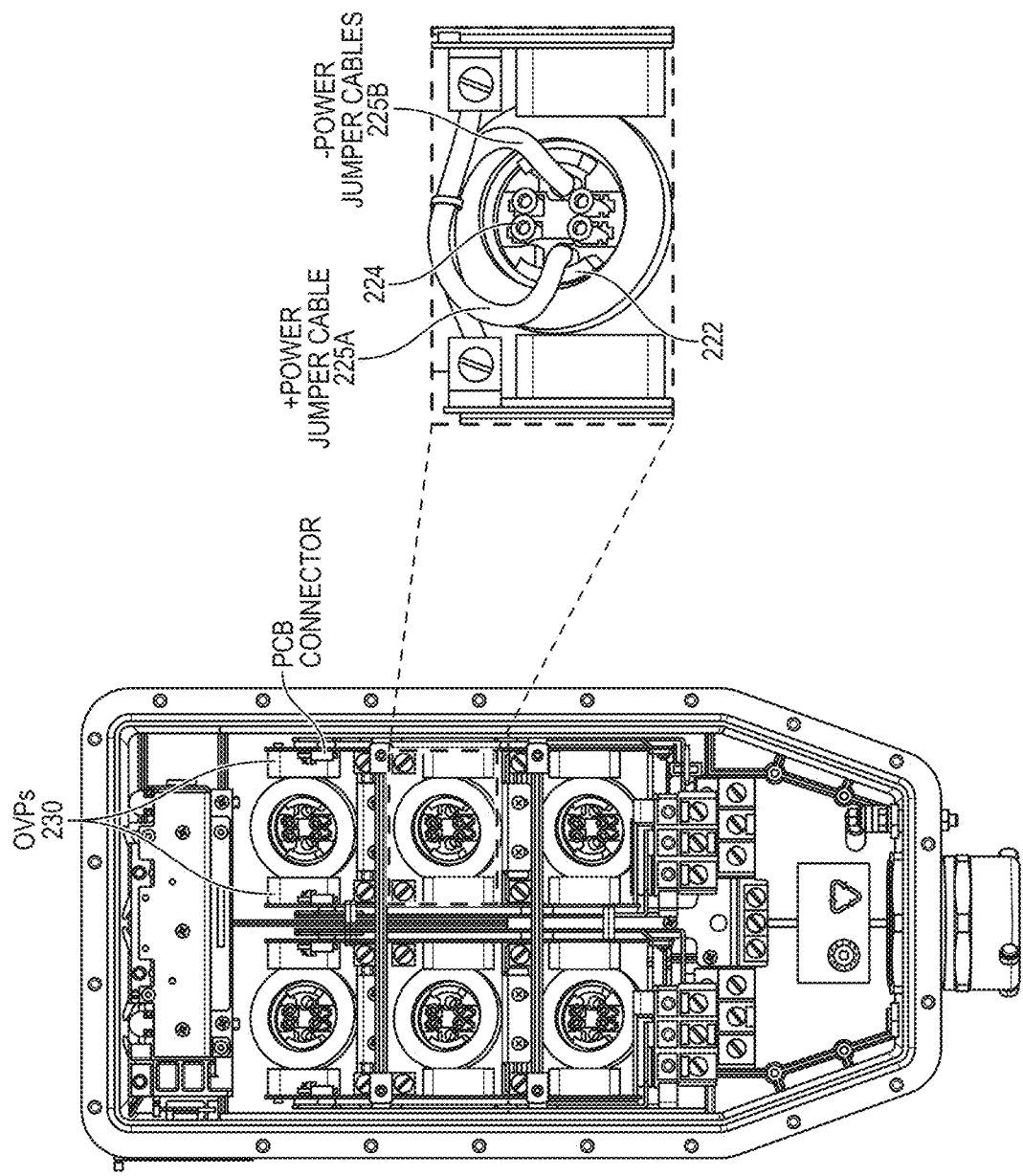
FIG. 3A is a diagram also showing OVP modules disposed in the interior portion of the enclosure.

Referring again to FIG. 2C and to FIG. 3A, in a further aspect of the disclosed embodiments, the enclosure 202 further includes a plurality of over voltage protection (OVP) modules 230A 230B (collectively OVP modules 230) that provide lightning strike protection. There is an OVP module 230 on opposite sides of each hybrid adaptor 206 and the OVP module 230 is mounted directly on one of the PCBAs 228 in that column (or row). This is in contrast to conventional suppression devices in which one casing houses double OVP modules. Here, the OVP modules 230 are split to save space and make the overall distribution and signaling unit 50 more compact in size. In further detail, a respective pair of OVP modules, e.g., OVP modules 230A and 230B, is disposed adjacent to each of the hybrid adaptors 206. One OVP module 230A in the pair is disposed on PCBA 228C adjacent to one side of the hybrid adaptor 206 and the second OVP module 230B the pair is disposed on PCBA 228D adjacent to the opposite side of the hybrid adaptor 206. In one embodiment, the OVP modules 230 may have a length that is less than a total diameter of the hybrid adaptors 206. The OVP modules 230 are components of the PCBAs 228, and in one embodiment, are screwed onto the PCBs, as opposed to being soldered.

Referring again to FIG. 3A, an enlarged view of the connections to power terminals 222 and fiber optic terminals 224 of the hybrid adaptors 206 is shown. Coupled the power terminals 222 of each hybrid adaptor 206 is one end of a power jumper cable 225, while the other end of the power jumper cable 225 is coupled to the OVP modules 230 adjacent to the hybrid adaptor 206. As shown, each power jumper cable comprises a positive power jumper cable 225A and a negative power jumper cable 225B. Referring to FIGS. 2C and 3A, the power jumper cables 225A and 225B plug into the ends of power terminals 222. The fiber optic cables 226 plug into the fiber optic terminals 224. The power terminals 222 and fiber optic terminals 224 pass through an interior of the hybrid adaptors 206 to an exterior of the hybrid adaptors 206. Hybrid RRU jumper cables (not shown) connect to the power terminals 222 and fiber optic terminals 224 on the exterior of the hybrid adaptors 206 to couple the hybrid adaptors 206 to the RRHs. The hybrid RRU jumper cables may include supply power (−48) and return (RTN) power lines.

Figure 3B:
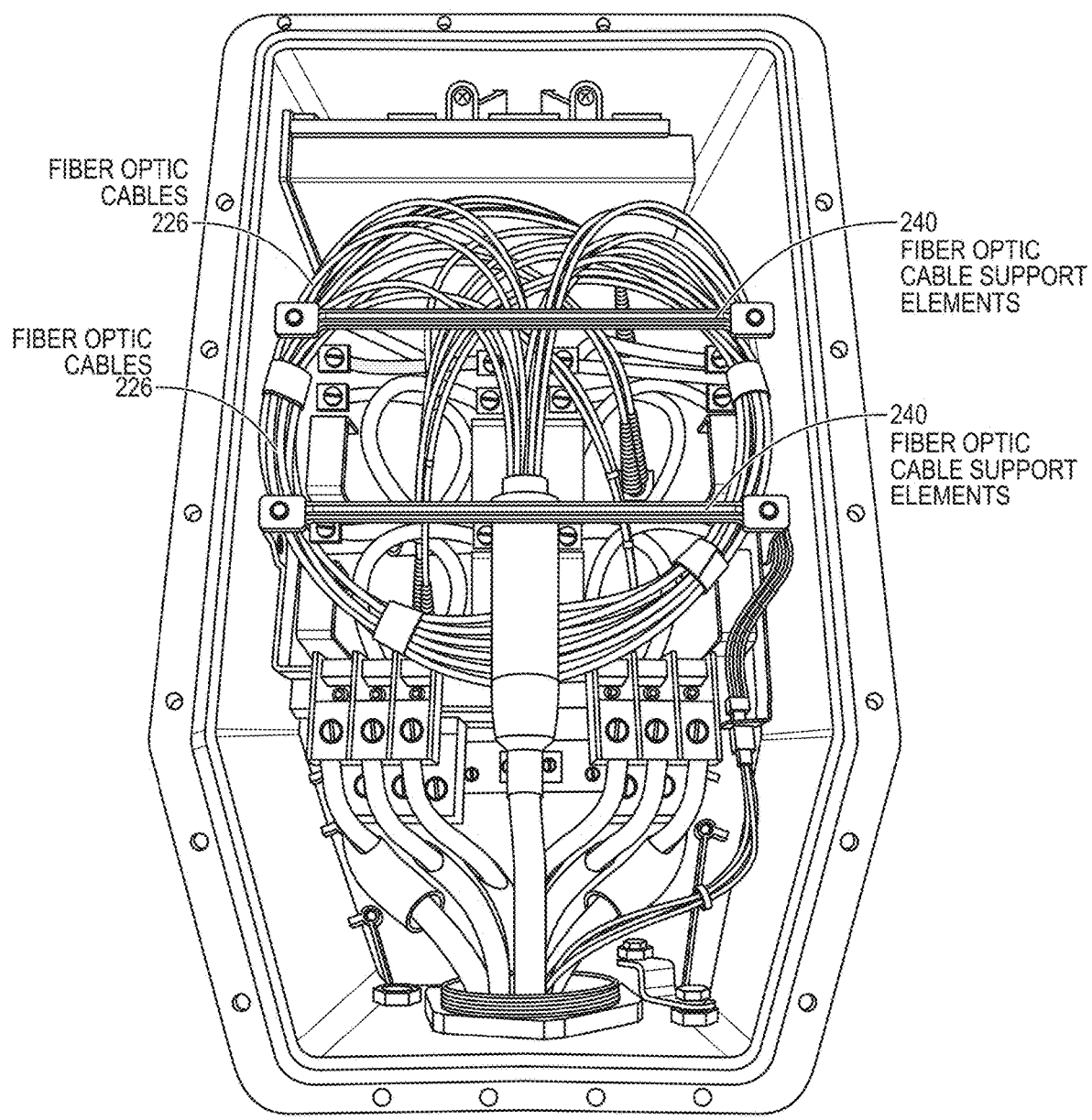
FIG. 3B is a diagram showing the fiber optic portion of the hybrid cable routed through the interior portion of the enclosure.

FIG. 3B is a diagram showing that the fiber optic portion of the hybrid cable (or the fiber optic cable in case of separate power and fiber optic trunk cables) is routed through the interior portion of the enclosure 202. Fiber optic cables (along with power cables) enter through a bottom of the enclosure 202 and are routed through the middle of the enclosure to the various fiber terminals 224 of the hybrid adaptors 206 according to one embodiment. FIG. 2B illustrates that the enclosure 202 includes fiber optic cable support elements 240 coupled to opposite sides of the enclosure. The fiber optic cable support elements 240 are configured to retain one or more fiber optic cables using one or more fasteners. In this example, two fiber optic cable support elements 240 are depicted running across the width of the enclosure, but in alternative embodiments, more or fewer support elements may be used, and the fiber optic cable support elements 240 may run in any suitable configuration (e.g., lengthwise) in the enclosure. Portions of the fiber optic cables 226 may be fastened to the support elements 240 using, for example, hook-and-loop fasteners coupled to the support elements 240. Additionally, the support elements 240 may be disposed between the fiber optic cables 226 and the removably attachable dust cover 204 to help protect the fiber optic cable against crimping or other damage during the assembly of the housing.

Referring again to FIG. 2C, according to a further aspect of the disclosed embodiments, the enclosure 202 further includes a PCBA chamber 231 housing a PCBA module 232. The PCBA module 232 is slideably (or removably) docked in the PCBA chamber 231 from the exterior of the enclosure. The PCBA module 232 includes a processor that may be configured to initiate and transmit alarm signals to a device at the base, such as base suppression unit 40. The processor may be also configured to receive voltage values measured by circuitry that monitors DC voltages input to the RRHs, and to transmit the voltage values to the base through a communication protocol such as RS485, for example.

In addition, the PCBA module 232 may include a suite of one or more sensors and monitoring logic to identify different alarm and voltage conditions. For example, the monitoring logic may detect a failure of the OVP modules 230 within distribution and signaling unit 50, detect intrusion into the distribution and signaling unit 50, detect water infiltration within the distribution and signaling unit 50, and/or detect voltage levels within distribution and signaling unit 50 or as output to the RRHs.

The distribution and signaling unit 50 may be sized and dimensioned to effectively route power and data cabling, as described above. However, the distribution and signaling unit 50 provides this increased functionality in a relatively smaller footprint compared to conventional distribution units to achieve minimal footprint on the tower 14. Referring again to FIGS. 2A and 2B, in some embodiments, the size of the distribution and signaling unit 50 may be less than 10 mm in width and less than 20 inches in length. In one specific example shown in FIG. 2A, the exterior portion of the distribution and signaling unit 50 may be 5.8"±0.02" D (with the enclosure 202)×9.8"±0.02" W×19.8"±0.02" L. This is contrast with prior units that were relatively large by comparison. For example, U.S. Pat. No. 10,971,928, herein incorporated by reference, may describe a similar device, but at a significantly larger size with dimensions of 11.4" D×15.7" W×19.4" L. And application US 2021091481 A1 (EP3798706A1) herein incorporated by reference, may refer to a similar in size pendant unit, but that unit has minimum functionality since there is no voltage monitoring and no alarm detection or signaling. Both of these devices also do not utilize multiple PBCAs for connection with OVP modules or include a removable PCBA module.

Figure 4A:
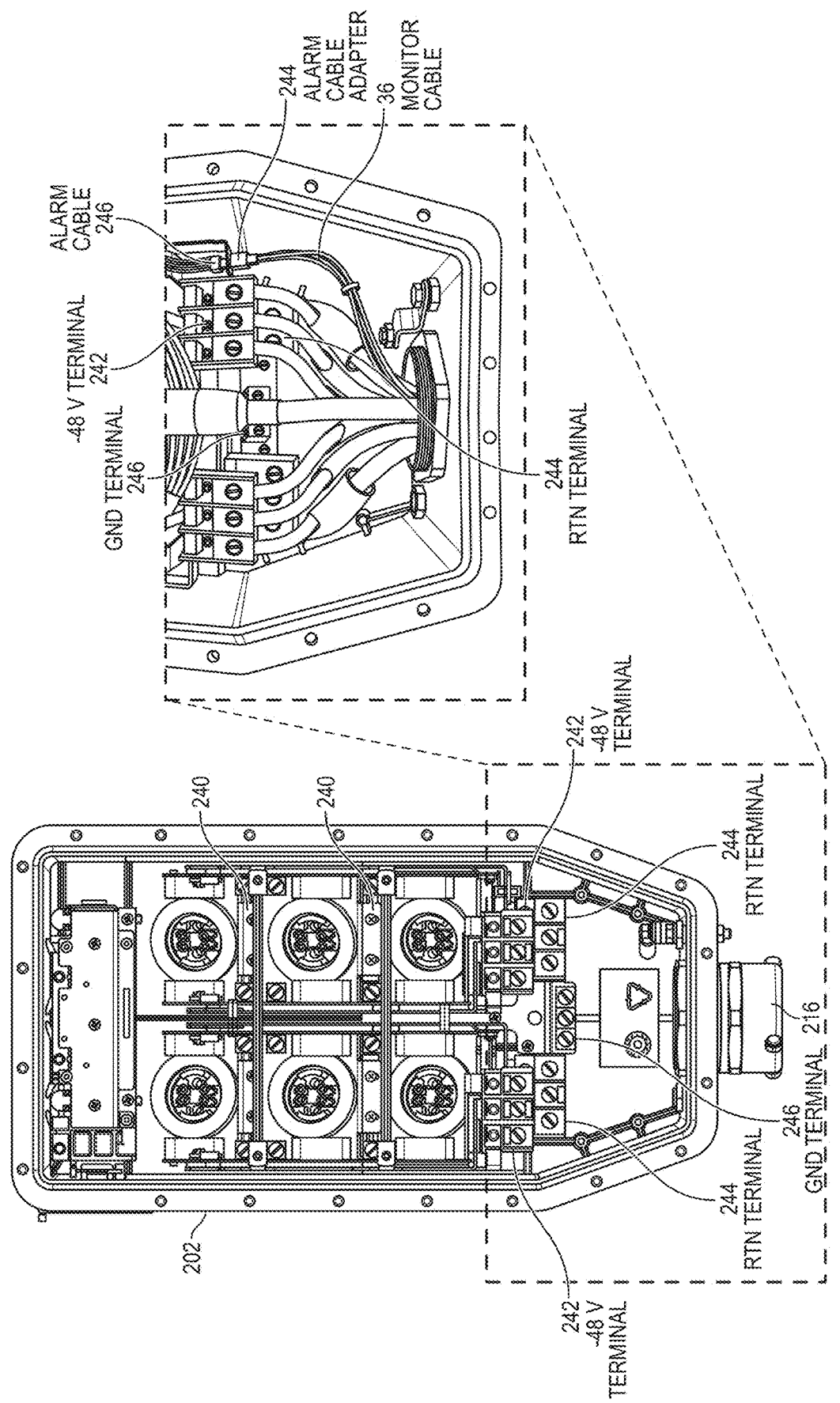
FIGS. 4A, 4B, 4C and 4D are diagrams providing a detailed view of power connections within the enclosure.

FIGS. 4A, 4B, 4C and 4D are diagrams providing a detailed view of power connections within the enclosure 202. FIG. 4A shows an enlarged view of power cables of trunk cable 214 entering the able entry and clamping mechanism 216 from the bottom of the enclosure 202. The lower part of the enclosure 202 includes power terminals comprising a left and right −48 V terminals 242, left and right return (RTN) terminals 244, and a ground (GND) terminal 246. To optimize the cable routing and minimize the assembly and installation time, the power terminals (−48 V, RTN and GND) and run widthwise partially across the enclosure and are connected to each OVP module. The power cables are connected to the −48 V terminals 242 and the RTN terminals 244. Rather than being connected to bus bars, the OVP modules 230 are mounted on the PCBAs 228, which are connected to the −48 V terminals 242 and the RTN terminals 244. Jumper cables 225 (FIG. 3A) then connect to the OVP modules 230 to the hybrid adaptors 206 to, in effect, terminate the power cables at the hybrid adaptors 206. The fiber optic cables 226 are terminated directly at the hybrid adaptors 206, as explained above in FIG. 3B.

Figure 4B:
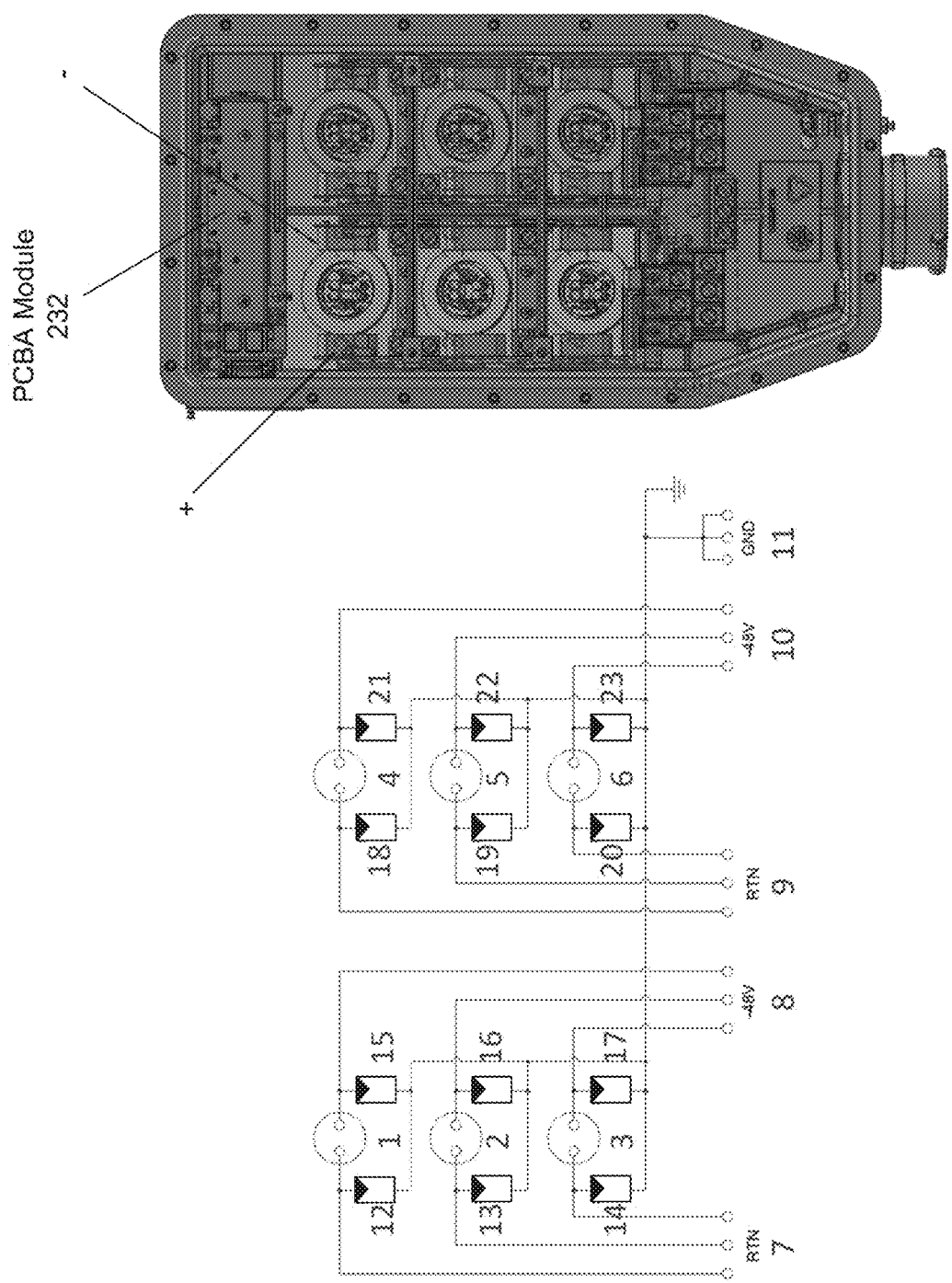
Figure 4C:
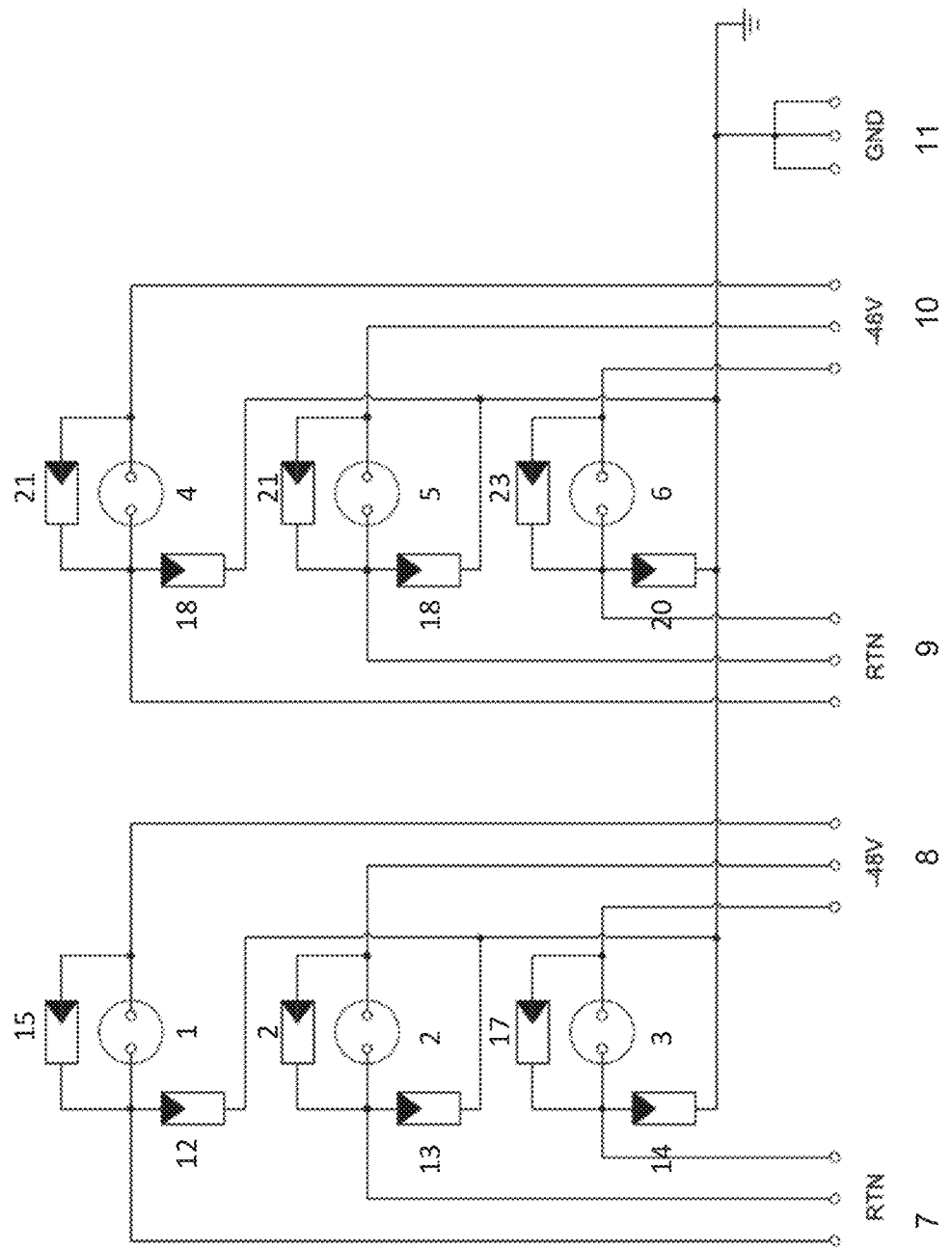

FIGS. 4B and 4C are circuit diagrams showing connections between the hybrid adaptors 206, the power terminals (−48 V terminal 242, the RTN terminal 244, and the GND terminal 246) and the OVP modules 230 (through the PCBAs 228) in further detail. In FIGS. 4B and 4C only, the connected components are indicated using reference numerals 1-23. The components shown are hybrid adaptors 1-6, left RTN terminal 7, right RTN terminal 9, left −48 V terminal 8, right −48 V terminal 10, GND terminal 11, and OVP modules 12-23. FIG. 4B shows one example embodiment, where the OVP modules 12-23 are installed between −48 Vdc to GND and between RTN to GND. As an example, OVP module 12 for hybrid adaptor 1 is shown connected to RTN terminal 7, while OVP module 15 for hybrid adaptor 1 is shown connected to −48 V terminal 10. All the OVP modules 12-23 are connected to the GND terminal 11. FIG. 4C shows another example embodiment, where the OVP modules 12-23 are installed between −48 Vdc to RTN and between RTN to GND.

Figure 4D:
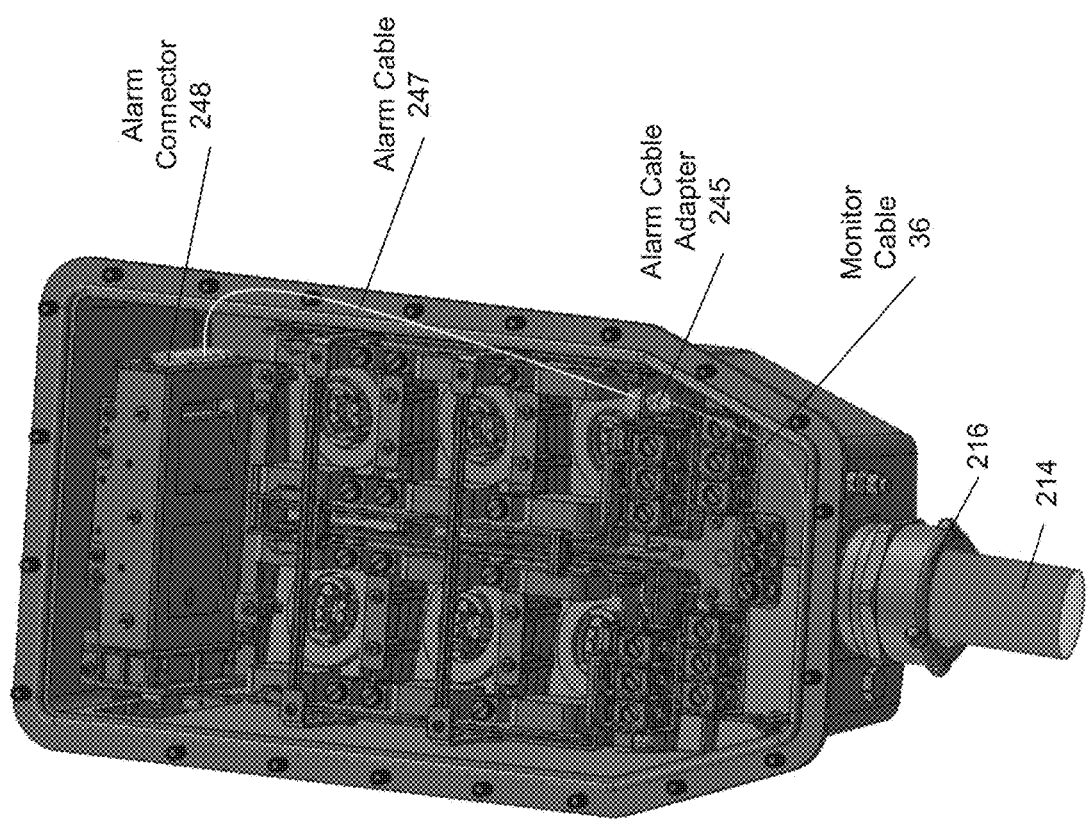

FIG. 4A and FIG. 4D show that monitor cables 36 from the base suppression unit 40 enter through the cable entry and clamping mechanism 216 of the enclosure 202 and are routed to alarm cable adaptor 245. Alarm cable 247 is connected to the alarm cable adaptor 245 and terminates at the PCBA module 232 at the top of the enclosure 202. The PCBA module 232 uses the monitor cables 36 to transmit different alarm and voltage conditions from the distribution and signaling unit 50 to the base suppression unit 40. In another embodiment, the PCBA module 232 may transmit the alarm and voltage signals to the base wirelessly.

Figure 4E:
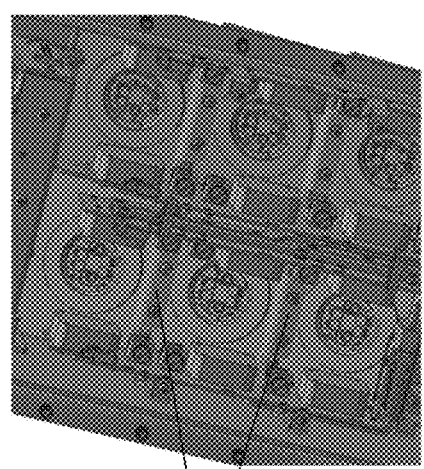
FIG. 4E is a diagram showing ground bus bars.

FIG. 4E is a diagram showing ground bus bars 250, which are connected the GND terminals. The ground bus bars 250 are located horizontally under the first two rows of hybrid adaptors. In summary, incoming power cables terminate at the power terminals at the lower part of the enclosure. Current from the power cables passes from the power terminals to the PCBAs 228 and ground bus bars 250 (connection to ground). The current then passes from jumper power cables 225 to the hybrid adaptors 206 and on to the RRHs.

Figure 5:
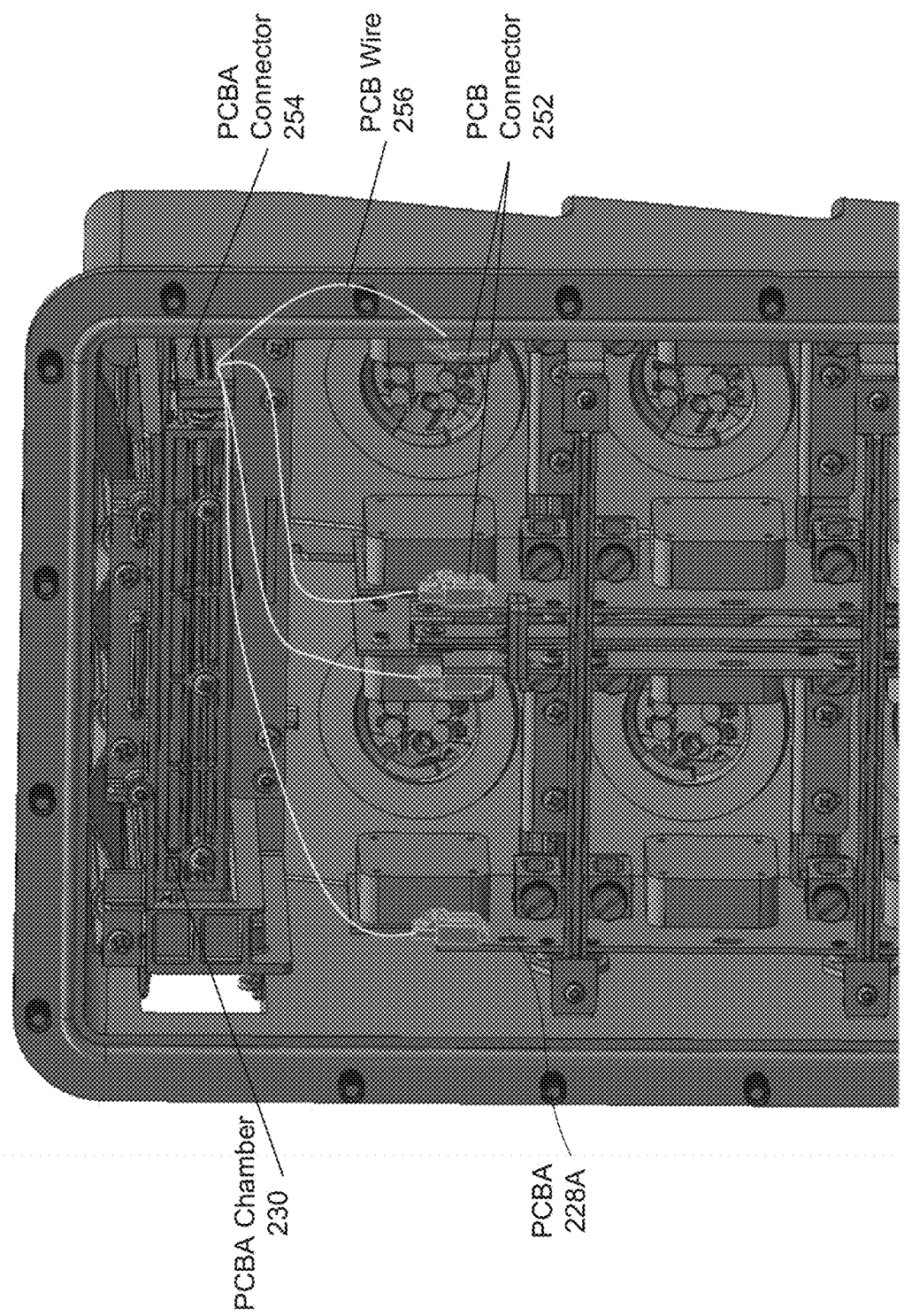
FIG. 5 is a diagram illustrating the interior of the enclosure showing that each PCBA includes a PCB connector.

FIG. 5 is a diagram illustrating the interior of the enclosure showing that each PCBA 228 includes a PCB connector 252 on one end to transfer signals from the PCBA 228 to the PCBA module 232 via a PCB wire 256. The PCB wire 256, in turn, is connected to alarm connector 248 of the PCBA chamber 231.

Figure 6A:
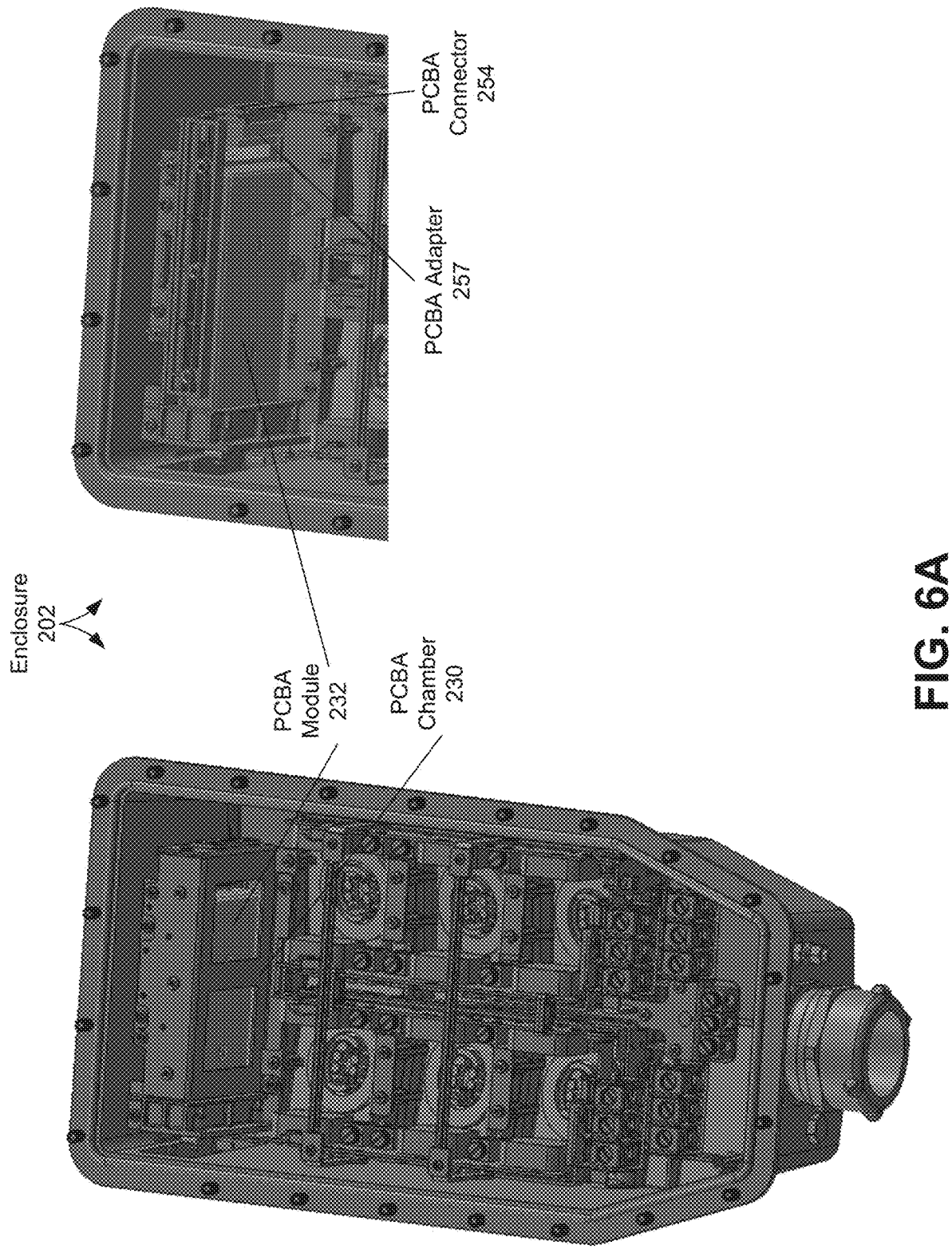
FIGS. 6A and 6B are diagrams illustrating an angled view of the interior and exterior of the enclosure, respectively, to show accessibility to the PCBA module.
Figure 6B:
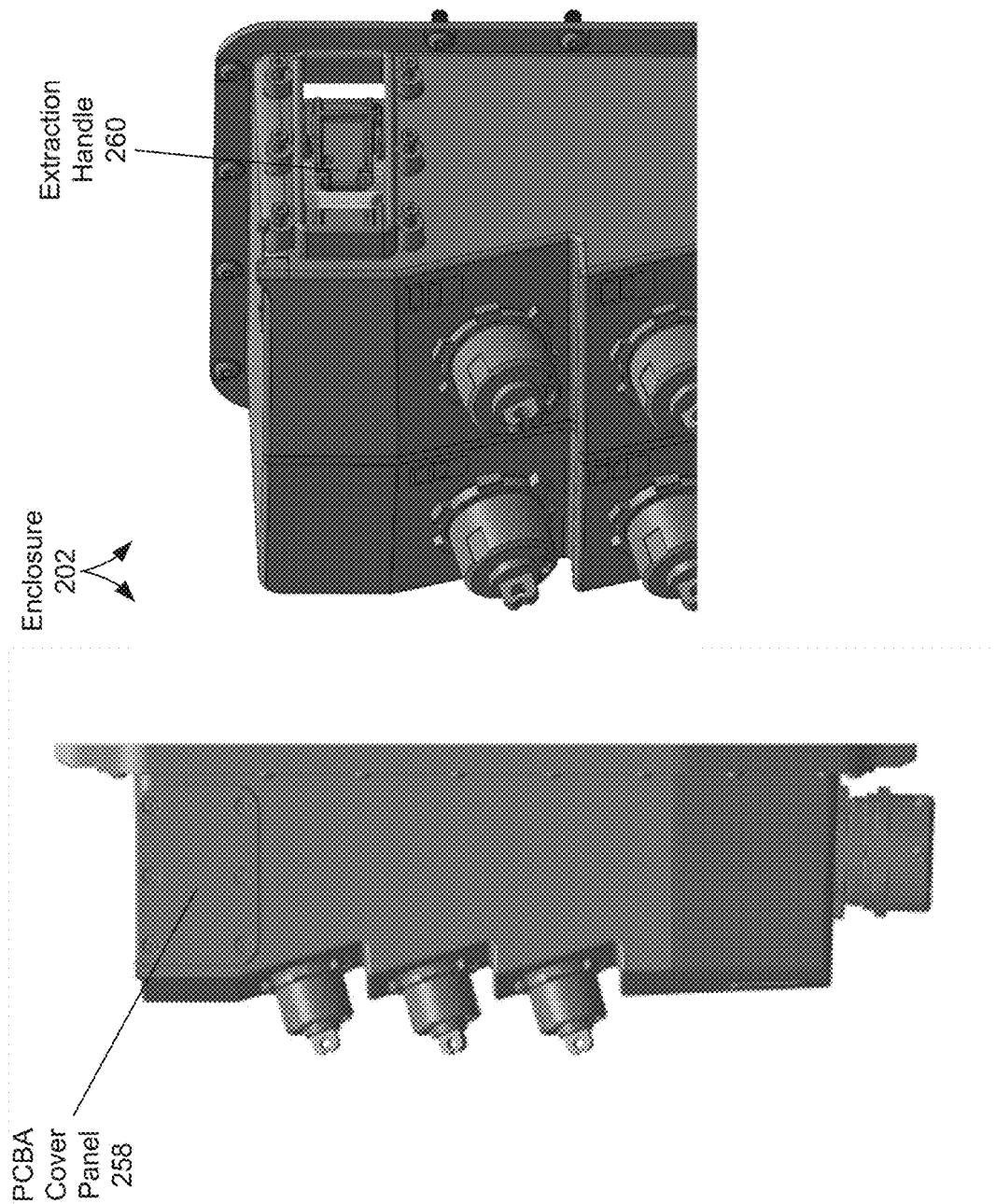

FIGS. 6A and 6B are diagrams illustrating an angled view of the interior and exterior of the enclosure, respectively, to show accessibility to the PCBA module. Referring to FIG. 6A, the left side shows the PCBA module enclosed by the PCBA chamber 231, while the right side shows a cutaway view of the PCBA chamber 231 to reveal the PCBA module 232. The PCBA module 232 may include a processor, microcontroller or ASIC (not shown). In the view without the PCBA chamber 231, the PCBA module 232 is shown coupled to a PCB adaptor 257, which is plugged into PCBA connector 254 at the rear of the PCBA chamber 231. The PCBA module 232 is pluggable to, and from, the PCBA adaptor 257, which is fixed to the alarm connector 248. FIG. 6A shows that the PCBA chamber 231 is preferably located adjacent a side wall of the enclosure.

The left side of FIG. 6B shows that the PCBA chamber 231 is adjacent to the side wall of enclosure and is accessible by a cover panel 258 on an exterior of the enclosure. The right side of FIG. 6B is a view with the cover panel 258 removed to show that the cover panel 258 conceals an extraction handle 260 that can be pulled by an operator to extract the PCBA module 232 from the PCBA chamber 231. Thus, the PCBA module 232 is accessible from an external surface of the enclosure 202 once the operator removes cover panel 258. After the cover is removed, the PCBA module 232 may be extracted from the enclosure by an operator by pulling an extraction handle 260 in case the PCBA module 232 is damaged, for example. According to the disclosed embodiments, the PCBA module 232 is detachable and replaceable (plug & play) from the enclosure 202 without interrupting any connection of the incoming power and fiber cables.

Figure 6C:
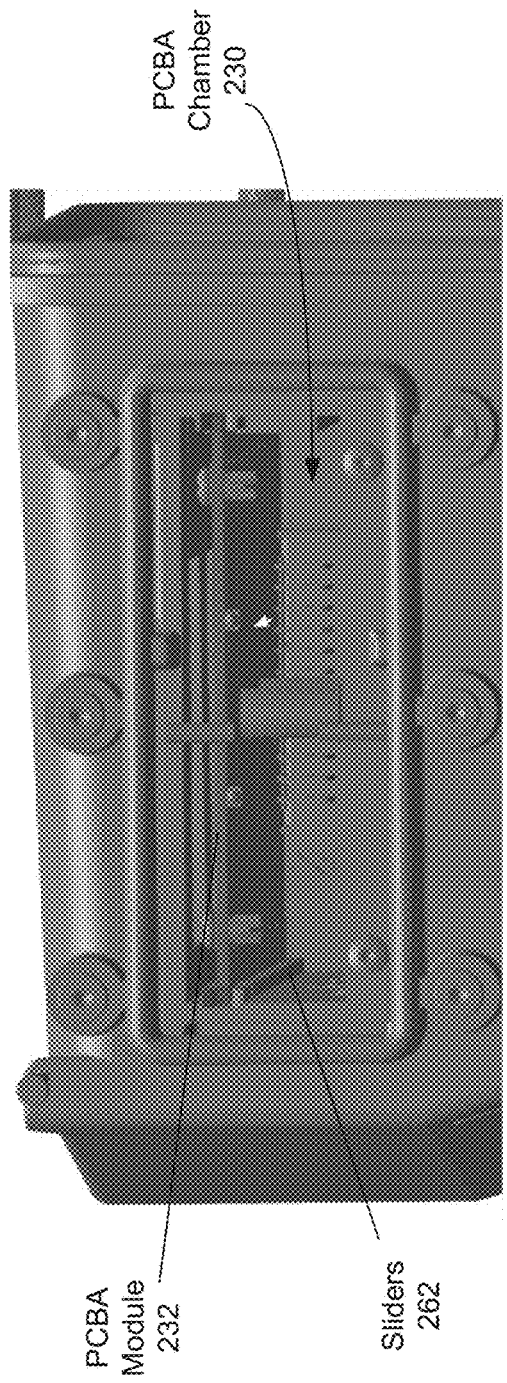
FIG. 6C-6D are diagrams illustrating a side of the enclosure with both a cover panel and an extraction handle removed.
Figure 6D:
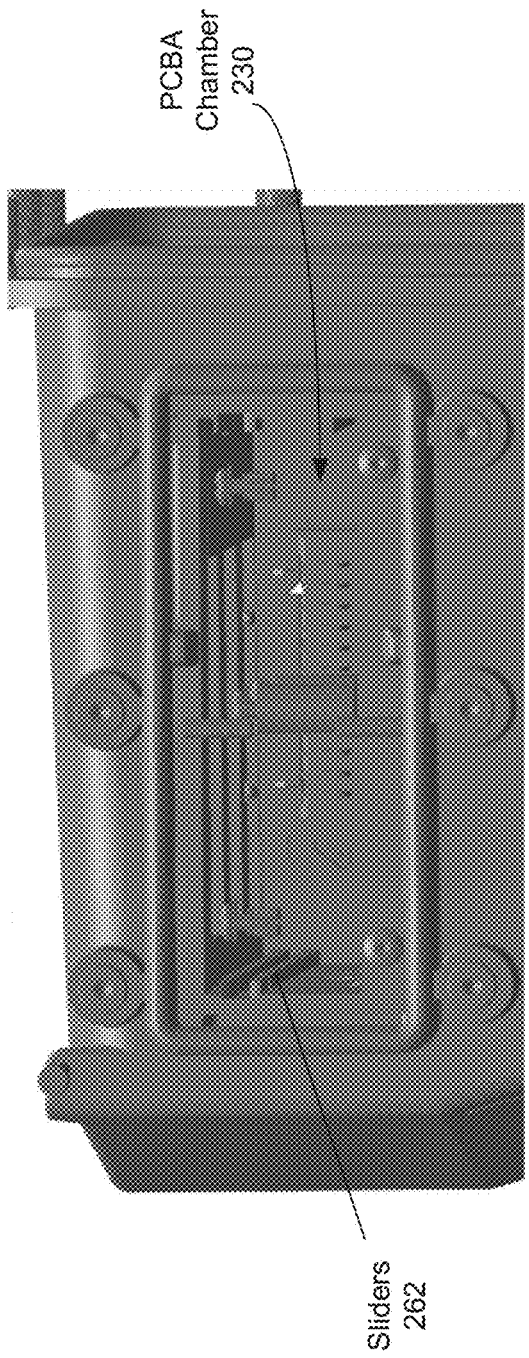

FIG. 6C-6D are diagrams illustrating the side of the enclosure with both the cover panel 258 and extraction handle 260 removed. FIG. 6C shows the PCBA module 232 inserted into the PCBA chamber 231 on a pair of sliders 262 formed along side walls of the PCBA chamber 231. The pair of sliders 262 enable the PCBA module 232 to be slid in and out of the PCBA chamber 231 by the operator. FIG. 6D shows the PCBA chamber 231 with the PCBA module 232 removed.

The PCBA module 232 includes a central processing unit (CPU) or microcontroller that generates messages indicating failures of OVP modules 230, voltage levels on the power cables, wiring anomalies, or any other power disruption. As mentioned above, the CPU may send intrusion or water ingress messages based on activation of an intrusion switch (not shown) or activation of a water detection switch (not shown). The PCBA module 232 may use a RS485 communication link with 2 twisted pair (+ground) wires to communicate voltage, up-converter system, and alarm data to base suppression unit 40 in FIG. 1. Firmware operating in the CPU on PCBA module 232 can be updated through the RS485 connection.

PCB wires 256 (FIG. 5) from the PCBAs 228 connect DC voltages on OVP modules 230 to the PCBA module 232. The voltages may be tied together using diodes to create a common bus to voltmeter (VM) and alarm (ALM) circuitry on to the PCBA module 232. The voltages may be also connected to precision resistor divider networks and transient-voltage-suppression (TVS) protection in OVP modules 230 and may be measured with an analog to digital converter (ADC).

A method of manufacturing a distribution and signaling unit may comprise forming an enclosure comprising walls forming an interior and an exterior, the enclosure configured to receive a trunk cable entering the interior portion of the enclosure. The trunk cable may comprise power cables and fiber optic cables. Hybrid adaptors are provided that are arranged in an array and extend through one or more of the walls of the enclosure, where each of the hybrid adaptors includes a power terminal and a fiber terminal in an interior of the enclosure. A plurality of printed circuit board assemblies (PCBAs) are mounted in the enclosure, wherein pairs of the PCBAs are located in proximity to respective ones of the hybrid adaptors. The plurality of over voltage protection (OVP) modules are mounted directly on one of the plurality of the PCBAs adjacent to the hybrid adaptors. A PCBA module is removably inserted into a chamber in the enclosure and is coupled to the PCBAs. The PCBA module includes a processor configured to transmit alarm signals and voltage values measured from the one or more power cables to a remote location.

A distribution and signaling unit with over voltage protection for fiber optic and power cables has been disclosed. The figures listed above illustrate examples of embodiments of the application and the operation of such examples. In the figures, the size of the boxes is not intended to represent the size of the various physical components. Where the same element appears in multiple figures, the same reference numeral is used to denote the element in all of the figures where it appears. While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A distribution and signaling unit, comprising:
   an enclosure comprising walls forming an interior and an exterior, the enclosure configured to receive a trunk cable entering an interior portion of the enclosure, the trunk cable comprising power cables and fiber optic cables;
   hybrid adaptors arranged in an array in the interior and extend through one or more of the walls of the enclosure, each of the hybrid adaptors including a power terminal and a fiber terminal in the interior of the enclosure;
   a plurality of printed circuit board assemblies (PCBAs) mounted in the enclosure;
   a plurality of over voltage protection (OVP) modules adjacent to the hybrid adaptors; and
   a PCBA module in the enclosure, the PCBA module including a processor configured to transmit alarm signals or voltage values measured from the power cables to a remote location.

2. The unit of claim 1, wherein pairs of the plurality of PCBAs are located in proximity to respective ones of the hybrid adaptors.

3. The unit of claim 2, wherein the plurality of OVP modules are mounted directly on one of the plurality of PCBAs.

4. The unit of claim 1, wherein PCBA module is slideably inserted in a chamber in the enclosure and is coupled to the plurality of PCBAs.

5. The unit of claim 1, wherein respective pairs of the plurality of PCBAs are mounted in the enclosure in proximity to a column of hybrid adaptors in the array.

6. The unit of claim 5, wherein each of the respective pairs of the plurality of PCBAs comprises:
   a first PCBA located adjacent to a first side of a first column of hybrid adaptors; and
   a second PCBA located adjacent to a second side of the first column of hybrid adaptors.

7. The unit of claim 5, wherein the respective pairs of the plurality of PCBAs are mounted to one of the walls in the interior of the enclosure.

8. The unit of claim 5, wherein the respective pairs of the plurality of PCBAs are positioned lengthwise in the enclosure and mounted perpendicular to a rear wall.

9. The unit of claim 5, wherein the respective pairs of the plurality of PCBAs are mounted parallel to a rear wall.

10. The unit of claim 5, wherein each of the respective pairs of PCBAs includes a PCBA connector and a PCBA wire coupled between the PCBA connector and the PCBA connector on the PCBA module.

11. The unit of claim 1, wherein a respective pair of the plurality of OVP modules is disposed directly adjacent to respective ones of the hybrid adaptors.

12. The unit of claim 1, wherein each pair of the plurality of OVP modules comprises a first OVP module and second OVP module, each having a length that is less than a diameter of the hybrid adaptors.

13. The unit of claim 1, further comprising a chamber adjacent to a side of the enclosure, the chamber including a PCBA adaptor in a rear thereof into which the PCBA module is removably docked.

14. The unit of claim 13, wherein the chamber further includes an alarm connector coupled to a PCBA connector, the alarm connector connected to an alarm wire that enters the enclosure with the power cables, wherein the PCBA module transmits the alarm signals via the alarm wire.

15. The unit of claim 13, wherein the PCBA module is configured to transmit the alarm signals wirelessly.

16. The unit of claim 13, wherein the chamber for the PCBA module is accessible by a cover panel on an exterior of the enclosure.

17. The unit of claim 16, wherein the cover panel conceals a handle that can be pulled by an operator to extract the PCBA module from the chamber.

18. The unit of claim 17, wherein the chamber includes a pair of sliders on opposite ones of the walls, the pair of sliders enabling the PCBA module to be slid in and out by the operator.

19. The unit of claim 1, further comprising one or more power jumper cables coupled between the power terminal each of the hybrid adaptors and to the plurality of OVP modules adjacent to each of the hybrid adaptors.

20. A distribution and signaling unit configured to connect to ends of a trunk cable, comprising:
   an enclosure comprising walls forming an interior and an exterior, the enclosure configured to receive the trunk cable entering an interior portion of the enclosure, the trunk cable comprising power cables and fiber optic cables;
   hybrid adaptors arranged in an array of rows and columns in the interior, the hybrid adaptors extending through at least one wall of the enclosure;
   a first printed circuit board assembly (PCBA) and a second PCBA located in proximity to respective columns or rows of the hybrid adaptors;
   a plurality of over voltage protection (OVP) modules adjacent to the hybrid adaptors; and
   a PCBA module in the enclosure, the PCBA module including a processor that transmits alarm signals or voltage values measured from the power cables to a remote location.

21. A method of manufacturing a distribution and signaling unit, comprising:
   forming an enclosure comprising walls forming an interior and an exterior, the enclosure configured to receive a trunk cable entering an interior portion of the enclosure, the trunk cable comprising power cables and fiber optic cables;
   providing hybrid adaptors arranged in an array in the interior and extending through one or more of the walls of the enclosure;
   mounting a plurality of printed circuit board assemblies (PCBAs) in the enclosure;
   mounting each of a plurality of over voltage protection (OVP) modules adjacent to the hybrid adaptors; and
   inserting a PCBA module into the enclosure, the PCBA module including a processor that transmits alarm signals or voltage values measured from the power cables to a remote location.

* * * * *